United States Patent Office 3,088,957
Patented May 7, 1963

3,088,957
METHOD FOR SEPARATING ORGANOLEAD
COMPOUNDS
Tom W. McKay, Baton Rouge, La., assignor to Ethyl Corporation, New York, N.Y., a corporation of Virginia
No Drawing. Filed July 16, 1959, Ser. No. 827,444
8 Claims. (Cl. 260—437)

The present invention is concerned with a method for separating organolead compounds, particularly the separation of such compounds from other organometallic compounds.

By methods previously employed for the preparation of organolead compounds, there has been no particular problem in separating and recovering the organolead compound from the system, especially the problem of separating organolead compounds from other organometallic compounds. This is particularly evident when one considers that the present commercial process involves the reaction of a sodium-lead alloy with ethyl chloride and no organometallic compound is formed other than an organolead compound. Likewise, in those reactions wherein a lead salt is caused to react with an organometallic compound, the organometallic compound is generally consumed so that there is no especial recovery problem. A more recent process that has been developed involves the reaction of bimetallic organometallic compounds, e.g. sodium aluminum tetraethyl, with lead metal and an organic halide, e.g. ethyl chloride. This process generally results in a mixture of organolead compound and an organometallic compound of another metal resulting as a by-product from the bimetallic compound. For example, when reacting sodium tetraethylaluminum with lead metal and ethyl chloride, tetraethyllead and triethylaluminum are formed as a mixture with sodium chloride, the latter being readily filterable from the mixture. While these mixtures can be subjected to distillation to result in the separate components of the mixture, the distillation technique is not easily accomplished since frequently boiling points are rather close, some decomposition may occur, and the operation is comparatively costly. Other methods of separation such as crystallization and extraction are likewise not readily adaptable. As a result of work in this field, a new method for separating organolead compounds from other organometallic compounds has been discovered.

Accordingly, an object of this invention is to provide a new and novel process for separating organolead compounds. Another object is to provide a method for the production and recovery of organolead compounds in higher yield and purity than heretofore available. A further object is to provide a more efficient and economical process for separating organolead compounds from other organometallic compounds. A specific object is to provide a method for separating tetraethyllead from solutions thereof which also contain triethylaluminum. A still further specific object is to provide a method for separating tetraethyllead from triethylaluminum or triethylborane compounds in a manner whereby a product is produced which can be easily treated to regenerate a bimetallic organometallic compound.

It has been found that organolead compounds can be readily separated and recovered from a mixture thereof with other organometallic compounds, particularly those of zinc, cadmium, and the group III–A elements, by treating the mixture with a material that complexes with the other organometallic compound. While many materials are applicable for treatment of the organolead and other organometallic compound mixtures, the alkali and alkaline earth metal hydrides, especially sodium hydride, are preferred because faster complexing occurs and a complex material is formed which is easily olefinated to produce a bimetallic organometallic compound which is a good alkylating agent. The method is generally applicable to mixtures of organolead compounds with organometallic compounds, especially the organo zinc, cadmium, and group III–A compounds, wherein the respective organometallic compounds are present in varying proportions. Basically, all that is required is to add at least ½ mole of the complexing material per mole of the organometallic compounds other than organolead compound present in the mixture, then separate the complex pound so formed or alternatively, olefinate it in situ and then separate by the usual physical separation techniques. Mixtures which are quite advantageously treated according to the technique of this invention are those of tetraethyllead with varying amounts of triethylaluminum. Thus, a preferred embodiment of this invention comprises treating a mixture of tetraethyllead and triethylaluminum with at least ½ mole of sodium hydride per mole of the triethylaluminum contained in the mixture. A mixture of organolead and other organometallic compound is treated, but it is to be understood that other constituents can be present as, for example, solvents provided such are inert to or at most only complex with the organometallic compounds present and the complexing material.

The process of this invention is of particular advantage in providing a simple and economical method for separating organolead compounds when in admixture with other organometallic compounds in a miscible and homogeneous system. By the process, the organolead compounds separate to one phase which is immiscible with the other organometallic compounds (this phase is then readily recoverable from the system, usually by decantation when the organolead compound is liquid) or a complex is formed which is more readily separated from the organolead compound than are the uncomplexed organometallic compounds. While in most instances the separation involves the formation of two separate liquid phases, in some instances, depending upon the particular organolead and other organometallic compound involved, a liquid and solid phase will result. In these instances, the two components are readily separated by filtration and any organolead product adhering to the solid complexed organometallic compound is recoverable by further drying or washing. Another advantage to the process is that by judicious choice of the treating or complexing material a complex is formed which is easily alkylated and the alkylated material is easy to separate from the organolead compound and can be used, for example, for further reaction with lead salts, or lead metal and organic halides, to produce organolead compound resulting in a regenerative type process. Other advantages of the process of this invention will be evident as the discussion proceeds.

In general, the mixtures which are treated according to the process of this invention will comprise at least one organolead compound mixed with at least one other organometallic compound, generally of a polyvalent element, particularly those of zinc, cadmium, and the group III–A elements capable of forming complexes with the complexing materials described hereinafter. The process is applicable to all types of organolead compounds in admixture with organometallic compounds of the polyvalent metal. The only particular limitations are that the homogeneous mixture of the organolead and other organometallic compound be liquid or form a homogeneous liquid system by the addition of essentially inert organic solvents. In other words, a homogeneous mixture of a solid organolead compound and another organometallic compound which is solid, other than one of lead, can be first dissolved in an appropriate organic solvent and then treated according to the process of this invention. Another criterion of the mixture is that the organometallic compounds other than the organolead compound form a complex with the treating material which is immiscible with the organolead compound whether or not an organic solvent is also present or is more readily susceptible to separation operations for recovering the organolead product than is the uncomplexed organometallic compound. Thus, the process of this invention is generally applicable to organolead compounds in admixture with other organometallic compounds, particularly those of zinc, cadmium, and the group III–A elements. The organic constituents on the metal compounds can therefore be any of the general classes including alkyl, alkenyl, cycloalkyl, cycloalkenyl, acetylenic, aromatic, heterocyclic, and combinations of such radicals. Another criterion of the organolead compound and the other organometallic compound is that each have at least one of such organic radicals bonded to the metal through a carbon atom and the remaining valences of the lead or other metal are satisfied by ligands, particularly the halogens, hydrogen, the same or different organic radicals, and alcoholate groups wherein the alcohol residues are the above described organic radicals having up to about 18 carbon atoms.

Typical examples of the mixtures which can be treated according to the process of this invention includes a mixture of tetraethyllead with triethylaluminum or triethylborane, tetraoctyllead with trioctylaluminum or trioctylborane, tetraoctadecyllead with trioctadecylaluminum, tetravinyllead with trivinylborane, tetra-1-hexynyllead with tri-1-hexynylaluminum, tetracyclohexyl or tetracyclohexenyllead with tricyclohexyl or tricyclohexenylaluminum, tetraphenyllead with triphenylaluminum or triphenylborane, tetrabenzyllead with tribenzylaluminum, tetraethyllead with triisopropylaluminum, tetramethyllead with triethylaluminum, diethyldimethyllead with trimethylaluminum, triethyllead chloride with diethyl aluminum chloride, tetraethyllead with diethylaluminum hydride or diethylboron hydride, tetraethyllead with ethylaluminum diethoxide and the like, including those mixtures wherein zinc, cadmium, and other group III–A organometallic compounds as, for example, those of the metals gallium, indium, and thallium, are substituted for the organoaluminum and organoboron compounds mentioned hereinbefore. The organolead and other organometallic compound in admixture will generally have up to and including about 18 carbon atoms in the organic radicals. Mixtures in which the organolead compound and other organometallic compound have boiling points and melting points which differ not more than about 25° C. are particularly applicable as are mixtures in which one of the components will commence to decompose at a temperature within about 25° C. of the boiling point of the other component. It is to be understood that the organic portions of such mixtures can be further substituted with substituents which are essentially inert in the system. However, it is preferred that the organic portions of the organometallic compounds be hydrocarbon radicals. Likewise, it will be evident that the process is applicable to mixtures containing one or more organolead compounds in admixture with one or more of other organometallic compounds as, for example, a mixture containing tetramethyllead, tetraethyllead, trimethylaluminum, and triethylaluminum. The preferred mixtures are those wherein the lead and the metal of the other organometallic compound are fully substituted by lower alkyl hydrocarbon radicals having up to and including about 8 carbon atoms with the ethyl radical being especially preferred. The process is especially applicable to the treatment of tetraethyllead when in admixture with triethylaluminum whether or not other constituents are present, such as organic solvents and insoluble materials, although, the latter are preferably removed prior to treatment.

The treating material which is employed is a material that will complex with the organometallic compound other than the organolead compound. Not only does it complex with the aforementioned organometallic compound, but it results in a material which is preferably immiscible with the organolead compound forming either an immiscible liquid or an immiscible solid or it forms a complex which can be more readily separated from the mixture than can the uncomplexed organometallic. Such materials are compounds of the alkali and alkaline earth metals. They are generally classed as hydrides, halides, pseudohalides, and organometallic compounds of the alkali and alkaline earth metals. The alkali and alkaline earth metals are intended to include the metallic elements of the groups I–A and II–A of the periodic chart of the elements, as for example, lithium, sodium, potassium, rubidium, cesium, magnesium, calcium, strontium, and barium. Of these, the alkali metals, especially sodium, are preferred because of their greater complexing ability and economy. Typical examples of the hydrides include sodium, lithium, potassium, magnesium, calcium, and strontium hydride. Examples of the halides are sodium, potassium, magnesium, calcium, and barium chloride, bromide, iodide, and fluoride. The pseudohalides are materials wherein the anion is generally classed as a pseudohalide, for instance, the cyanide anion. Typical examples of the pseudohalides include sodium, lithium, magnesium, calcium, and barium cyanide, cyanate, thiocyanate, and amide. Examples of the organometallic compounds of the alkali and alkaline earth metals are those wherein such metals are substituted for lead or aluminum and other zinc, cadmium, and group III–A elements in the description of organometallic compounds in the mixture as, for example, ethyl sodium, ethyllithium, ethylpotassium, diethyl calcium, diethyl magnesium, ethylmagnesium chloride, ethylmagnesium bromide, phenylsodium, sodium acetylide, cyclohexylsodium and the like. Of the organometallic alkali and alkaline earth complexing materials, the alkyl alkali and alkaline earth metal compounds wherein the alkyl groups contain up to about 8 carbon atoms are preferred, especially ethyl sodium. The metal hydrides, and especially sodium hydride, are the especially preferred treating and complexing agents since they are more economical and they also form a complex, e.g. with triethylaluminum forming sodium triethylaluminum hydride, which is readily reacted in situ or preferably after separation from the organolead compound with an olefin, as for example, ethylene, to produce a higher alkylated bimetallic organometallic compound, e.g. sodium tetraethylaluminum, which is valuable for reaction with various metal salts or with lead metal and organic halide to produce tetraethyllead and other organometallic compounds.

In some instances, the complex which is formed will be soluble in the solvent when such is contained in the mixture. In these instances, the complex is more readily separable from the mixture than the uncomplexed organometallic by distillation, concentration, and the like physical operations. This is especially true when the complex is an alkali or alkaline earth triorgano metal hydride such as, sodium triethylboron hydride. One very effective way to accomplish the separation and simultaneously result in a more useable complex when the complex is formed by treating with an alkali or alkaline earth hydride is to concentrate the solution by evaporation of the solvent and then treat the resulting mixture, if separation doesn't occur, with a suitable olefin such as ethylene as described above to form a more highly alkylated complex bimetallic organometallic compound which is immiscible with the organolead compound. The olefination is generally conducted at 20 to 150° C. and up to 1000 p.s.i. when the olefin is a gas.

The olefins which can be employed include, also, propylene, butylene, 1 or 2 octene, cyclohexene, styrene, and the like. They are preferably used in amount at least sufficient to react with the hydride components of the complex.

As briefly mentioned above, the process is applicable to the treatment of mixtures wherein varying amounts of the organolead and other organometallic compounds are present. It makes no difference whether the organolead or the other organometallic compound is in excess in the mixture. For example, effective separation can be accomplished when 100 parts of organolead compound are in admixture with one part or even less of the other organometallic compound and vice versa. The main criterion is that at least sufficient complexing material be used to complex with the other organometallic compound. In general, at least ½ mole of the complexing material per mole of the material to be complexed is employed in order to effect a complete separation. As a preferred embodiment, essentially one mole of the complexing material per mole or per two moles of the organometallic compound to be complexed is used since more effective and rapid separation is obtainable when using these proportions. It is to be understood, however, that higher molar ratios are applicable thereby providing a considerable excess of the complexing material since such excesses are readily recoverable from the system, generally by filtration. It is also to be noted that the presence of foreign materials does not hinder the present invention if such materials are essentially inert to the organometallic compounds present in the mixture and the complexing material. Such foreign materials include, for example, the solvents mentioned hereinafter, salts and the like.

The present invention will be further illustrated by the following examples wherein all parts are by weight unless otherwise specified.

*Example I*

To a reactor equipped with internal agitation was added a mixture containing 83 parts of tetraethyllead and 21 parts of triethylaluminum under a nitrogen atmosphere. Then, 2½ parts of sodium hydride was added to the reactor with agitation at room temperature. The solution began to warm slightly and all of the sodium hydride dissolved. Two separate liquid phases immediately formed. The two phases were separated by decantation. In this manner the lower phase comprising 76 parts of tetraethyllead was recovered and 24 parts of the upper phase comprising sodium triethylaluminum hydride was recovered. Thus, 92 percent of the tetraethyllead was separated from the solution. When a portion of the lower tetraethyllead phase was treated with a small amount of isopropyl alcohol, no reactivity was noted indicating that essentially no sodium triethylaluminum hydride was present in the tetraethylaluminum phase.

Similar results are obtained when diethylzinc, diethylcadmium, or triethylgallium are substituted for triethylaluminum in the above example.

*Example II*

The procedure of Example I is repeated with exception that a mixture containing 32.3 parts of tetraethyllead and 19.6 parts of triethylborane are treated with 4.8 parts of sodium hydride with agitation. The resulting mixture is then reacted with ethylene at 100° C. and 1000 p.s.i. for 4 hours. Sodium tetraethylboron precipitate as a solid phase and is separated by filtration. Tetraethyllead is recovered in essentially quantitative yield.

*Example III*

Example I is repeated with exception that the reaction mixture is first heated to 50° C. and then 4.0 parts of potassium hydride are substituted for the sodium hydride. Again two separate phases immediately form which are separated by decantation resulting in a high recovery of the tetraethyllead and the formation of potassium triethylaluminum hydride.

*Example IV*

When the mixture of Example I, but additionally containing benzene as solvent, is treated at 80° C. with calcium hydride employing ½ mole of calcium hydride per mole of triethylaluminum and the benzene is then removed by distillation, calcium triethylaluminum hydride precipitates as a solid and is readily filtered from the tetraethyllead.

*Example V*

When a 50:50 mixture of tetraethyllead and triethylaluminum is treated with ½ mole of potassium chloride per mole of the triethylaluminum contained in the mixture at room temperature, the two liquid layers rapidly form and the tetraethyllead is separated by decantation in high yield.

When sodium bromide, lithium iodide, or calcium iodide are substituted for potassium chloride, equally satisfactory separation is obtained.

*Example VI*

To a mixture containing 32.3 parts of tetraethyllead and 24.7 parts of diethylzinc is added 10.4 parts of ethylsodium. Two phases form and the tetraethyllead is separated in high yield from the sodium triethylzinc complex which is formed.

In place of ethylsodium, ethyllithium, diethylmagnesium, sodium acetylide or 1-hexynyl sodium can be substituted with equally good results.

*Example VII*

A mixture containing 32 parts of tetraphenyllead and 51.6 parts of triphenylaluminum is heated with 16.8 parts of phenyllithium in 100 parts diethyl ether at reflux temperature. The lithium tetraphenylaluminum formed is solubilized in the ether and the tetraphenyllead is removed from the mixture by filtration.

*Example VIII*

A mixture of 54 parts of tetracyclohexyllead and 55.2 parts of tricyclohexylaluminum in 100 parts of benzene is heated to 80° C. and then treated with 4.8 parts of sodium hydride at this temperature. The benzene is then removed by distillation and sodium tricyclohexylaluminum hydride precipitates from the tetracyclohexyllead. The solid is removed by filtration leaving essentially pure tetracyclohexyllead.

*Example IX*

Employing the procedure of Example VIII, tetra(2-phenylethyl) lead is separated from tri(2-phenylethyl)aluminum by treating a mixture of the two with sodium hydride in essentially equimolar amount to the aluminum compound at 80° C. in benzene solvent and proceeding as described.

*Example X*

When a mixture of 16 parts of tetraethyllead and 11.4 parts of triethylaluminum are treated with 2.1 parts of sodium fluoride at 70° C., two liquid layers immediately form which are readily separated by decantation to result in separation and recovery of tetraethyllead and the sodium fluoride complex of triethylaluminum $$(NaF \cdot 2Et_3Al)$$

*Example XI*

When a mixture containing 32.3 parts of tetraethyllead, 22.8 parts of triethylaluminum, and 15 parts of the dimethylether of diethylene glycol is treated with 4.8 parts of sodium hydride at room temperature, two separate layers form. The lower tetraethyllead layer is withdrawn recovering tetraethyllead in high yield and leaving sodium triethylaluminum hydride in solution in the dimethyl ether of diethylene glycol.

*Example XII*

When Example XI is repeated with exception that the mixture contains diethyl ether instead of the dimethyl ether of diethylene glycol. An equally efficient separation of the tetraethyllead is obtained leaving the sodium triethylaluminum hydride in solution in the diethyl ether.

Equally satisfactory results are obtained when a mixture of tetraoctyllead and trioctylaluminum in the dimethyl ether of diethylene glycol is substituted in Examples XI and XII as well as when the ether is replaced by the diethyl ether of ethylene glycol and the like ethers.

*Example XIII*

When a mixture containing 32.3 parts of tetraethyllead and 21.0 parts of triethylborane is heated to 50° C. and then treated with 4.8 parts of sodium hydride at this temperature, and the system then reacted with ethylene at 1000 p.s.i.g. and 150° C. for 6 hours, sodium tetraethylboron precipitates as a solid phase and is separated from the tetraethyllead by filtration.

*Example XIV*

When a mixture containing 16.2 parts of tetraethyllead, 11.4 parts of triethylaluminum, and 50 parts of triethylamine is treated with 2.4 parts of sodium hydride at room temperature, two separate phases are formed, the lower phase being tetraethyllead which is withdrawn from the system in high yield and purity.

*Example XV*

Tetraethyllead separates as a separate phase in high yield and purity when a mixture of 32.3 parts of tetraethyllead and 19.6 parts of triethylboron is treated with 13.0 parts of potassium cyanide at room temperature.

When this example is repeated substituting sodium cyanide; strontium, potassium, or calcium cyanate; sodium amide, or potassium thiocyanate, tetraethyllead is separated in high yield.

*Example XVI*

A mixture containing equimolar amounts of tetravinyllead and trivinylborane is treated with 1 mole of vinyllithium in ethyl ether per mole of the trivinylborane at room temperature. The ethyl ether is then evaporated leaving tetravinyllead containing solid lithium tetravinylboron. The mixture is filtered leaving essentially pure tetravinyllead as filtrate.

Similar results are obtained when cyclopentadienyl-sodium is used in place of vinyllithium.

*Example XVII*

Sodium hydride, 4.8 parts, are added to a mixture of 43.6 parts of tetraisobutyllead and 39.6 parts of triisobutylaluminum in 100 parts of benzene. The mixture is heated to 80° C. and maintained at this temperature for 3 hours, then the benzene is distilled therefrom. Tetraisobutyllead separates to the lower phase and is withdrawn in high yield and purity.

*Example XVIII*

A mixture of tetraethyllead with diethylaluminum chloride is treated, at room temperature, with one mole of potassium chloride per mole of aluminum compound present in the mixture. Tetraethyllead forms a separate liquid phase which is withdrawn from the system in high yield and purity.

When this example is repeated substituting diethylaluminum bromide or iodide, or ethylzinc iodide or chloride for diethylaluminum chloride, equally satisfactory results are obtained.

*Example XIX*

When a mixture of equimolar amounts of tetraethyllead and diethylaluminum ethoxide is treated with one mole of sodium hydride per mole of the aluminum compound present in the mixture, two phases form permitting separation of the liquid tetraethyllead.

*Example XX*

Tetraethyllead forms as a separate phase and is readily recovered when a mixture of tetraethyllead and diethylaluminum hydride is treated with sodium hydride.

The above examples are given by way of illustration and it is not intended that the invention be limited thereby. Other mixtures such as those described hereinbefore can be substituted as well as other complexing materials to produce equally satisfactory results.

With most of the complexing materials, the treatment is quite effective at room temperature. With others, some advantage in more rapid complexing is obtained in employing higher temperatures. Likewise, when the mixture to be treated is a solid mixture, it is preferable to increase the temperature to above the melting point of the mixture or first dissolve the mixture in a mutual solvent. In general, the temperature at which the treatment is conducted will vary according to the above considerations, but can usually be between about 0° C. to the decomposition temperature of the organometallic compounds present in the mixture. All other factors being equal, the more ionic the complexing agent, the lower the temperature required for effecting the treatment. For example, with the alkali and alkaline earth hydrides and their organometallic compounds such lower temperatures, as below 100° C., can be employed and room temperature is quite effective. Accordingly, when the above examples are conducted at these varying temperatures, equally good results are obtained. There is no necessity to employ a pressure system unless one operates above the boiling point of any of the constituents of the mixture treated. Likewise, because of the reactivity of the materials present in the system, all operations are generally conducted in an inert atmosphere. For this purpose, the inert gases, such as nitrogen, argon, neon, krypton, and xenon, are quite suitable. The length of reaction time is not critical. Generally, treating times sufficient to effect the formation of the two phases or the complexing are employed. In certain instances, this will occur instantly upon adding the complexing material. In other instances, reaction times up to about 5 hours are quite adequate.

While there is no necessity to employ a solvent for treating the mixtures according to the process of this invention, such can be employed to advantage when the mixture is a solid mixture of the organolead and other organometallic compound. Likewise, frequently mixtures of such compounds in solution are obtained in various processes and it is desirable to treat such mixtures without separation of the solvent. Examples of such solvents are the organic solvents which are essentially inert to the organometallic compounds and the treating agent as well as being liquid under the treating conditions. It is to be understood that such solvents can complex with the organometallic compounds in the system or be present as complexes since such do not interfere with the separation operations desired.

For such purposes, the hydrocarbons, ethers, and tertiary amines have been found most suitable. Among the hydrocarbons are included both aliphatic and aromatic materials as, for example, the hexanes, octanes, nonanes, cyclohexanes, benzene, toluene, xylene, tetralin, and the like. The ethers include, for example, diethyl ether, diamyl ether, dioctyl ether, methylamyl ether, diphenyl ether, dibenzyl ether, cyclic ethers, such as dioxane, tetrahydrofuran and the polyethers as, for example, the dimethyl, diethyl, dibutyl and the like ethers of ethylene glycol, diethylene glycol, triethylene glycol, and tetraethylene glycol. Included among the amines are the primary, secondary, and tertiary amines, especially the tertiary amines which are less reactive with the organometallic compounds and complexes formed. Typical examples of such amines include ethyl, butyl and octyl amine, diethyl amines, dibutyl amine, dicyclohexyl amine, diphenyl amine, dibenzyl amine, triethyl amine, triphenyl amine, aniline, pyridine, and isoquinoline. The aromatic hydrocarbons, cyclic ethers, polyethers and tertiary amines having up to about 18 carbon atoms comprise a preferred group of diluents because of their greater availability and easier recovery. The cyclic ethers and polyethers, especially tetrahydrofuran and the dimethyl, diethyl and methyl ethyl ethers of diethylene glycol are particularly preferred.

If a solvent is present in the system that is treated, it can be recovered, if desired, by distillation as indicated in the above examples. However, the mixture of the complex product material in the solvent, particularly the ethers, is useful as obtained and no separation need be made. For example, a solution of sodium triethylaluminum hydride in the dimethyl ether of diethylene glycol as recovered in Example XI can be reacted with ethylene under pressure to form sodium tetraethylaluminum.

As described previously, the process of this invention, especially when employing an alkali or alkaline earth metal hydride as the complexing material, is particularly applicable to a method of separating organolead product from other organometallic compounds when such are co-produced in a reaction directed primarily to the production of the organolead product. One such process is the reaction of a bimetallic organometallic compound wherein one metal is a group I-A or II-A metal and the other metal is a group II-B or III-A metal, including boron, with lead metal and an organic ester of an inorganic acid, e.g. an organic halide. This reaction is generally carried out at about 0 to 150° C. and, if desired, at autogeneous or suitable pressure to prevent vaporization. The following example will illustrate this particular application of the process of this invention forming a part of an integrated process for the production of tetraethyllead.

*Example XXI*

To an autoclave equipped with external heating means and agitation, which is precooled to −70° C., is added 16.99 parts of sodium-lead alloy (NaPb) in a sealed glass bulb and 70 parts of ethyl chloride are added thereto and the reactor sealed. The reaction mixture is preheated to 80° C. and agitated thereby breaking the glass bulb. The mixture is reacted at these conditions for 3 hours and cooled to −20° C. Then 20 parts of sodium tetraethylaluminum are added thereto along with 20 parts of ethyl chloride. The autoclave is again sealed and the reaction mixture is heated and agitated at 70 to 80° C. for 3 hours. The reaction mixture comprising tetraethyllead, triethylaluminum and sodium chloride is filtered to remove the sodium chloride. Then 1.45 parts of sodium hydride are added to the mixture whereby two separate layers form. The lower tetraethyllead phase is withdrawn thereby recovering tetraethyllead in high yield and purity. The separated upper phase is treated with an additional 1.45 parts of sodium hydride and diluted with 50 parts of toluene, then pressurized with ethylene at 1000 atmospheres and 140° C. for 3 hours producing sodium tetraethylaluminum which is recycled for reaction with lead metal and additional ethyl chloride.

Other examples of a regenerative type operation wherein mixtures of organolead and other organometallic compounds as described above are treated with an alkali or alkaline earth metal hydride will be evident. In such regenerative operations, the olefin employed, preferably corresponds to the organo radicals consumed in forming the organolead product.

The organolead compounds which are separated according to the process of this invention in high yield and purity from other organometallic compounds are well known and of considerable utility. Their wide use at present is as antiknock agents. For example, it is well known that when a minor amount of tetraethyllead is added to a fuel of the gasoline boiling range, the octane number and antiknock qualities of the fuel are enhanced.

Having thus described the process of this invention, it is not intended that it be limited except as set forth in the following claims.

I claim:
1. A process for recovering a hydrocarbon lead compound from a liquid mixture including the lead compound and another organometallic compound, the hydrocarbon lead compound having at least one hydrocarbon radical bonded to the lead through a carbon atom and the remaining valences thereof being satisfied by ligands selected from the group consisting of halogens, hydrogen, and alcoholate groups having up to about 18 carbon atoms in the alcohol residues thereof, said other organometallic compound being a hydrocarbon compound of an element selected from the group consisting of zinc, cadmium, and group III-A elements, and having at least one hydrocarbon radical bonded to the element by a carbon atom, the remaining valences thereof being satisfied by ligands selected from the group consisting of halogens, hydrogen, and alcoholate groups having up to about 18 carbon atoms in the alcohol residues thereof, said process comprising reacting the liquid mixture with a complexing compound capable of complexing with said other organometallic compound of the liquid mixture, nonreactive with the hydrocarbon lead compounds, and selected from the group consisting of hydrides, halides, pseudohalides, and hydrocarbon compounds of alkali and alkaline earth metals, and said complexing compound being provided in proportions of at least about ½ mole per mole of said other organometallic compound to form a complex immiscible with the hydrocarbon lead compound, and separating substantially pure hydrocarbon lead compound from the complex.

2. The process of claim 1 wherein said hydrocarbon lead compound is a tetraalkyllead compound, said other organometallic compound is a trialkylaluminum compound, and said complexing compound is an alkali metal hydride.

3. The process of claim 1 further defined in that said other organometallic compound is an aluminum trialkyl and the complexing compound is a pseudo halide of an alkali metal.

4. The process of claim 1 further defined in that said other organometallic compound is a dialkyl aluminum chloride and the metal compound is an alkali complexing chloride.

5. The process of claim 1 further defined in that said other organometallic compound is a dialkyl aluminum alkoxide and the metal compound is an alkali complexing hydride.

6. A process for recovering a hydrocarbon lead compound from a liquid mixture including the lead compound and another organometallic compound, the hydrocarbon lead compound having at least one hydrocarbon radical bonded to the lead through a carbon atom and the remaining valences thereof being satisfied by ligands selected from the group consisting of halogens, hydrogen, and alcoholate groups having up to about 18 carbon atoms in the alcohol residues thereof, said other organometallic compound being a hydrocarbon compound of an element selected from the group consisting of zinc, cadmium, and group III-A elements, and having at least one hydrocarbon radical bonded to the element by a carbon atom, the remaining valences thereof being satisfied by ligands selected from the group consisting of halogens, hydrogen, and alcoholate groups having up to about 18 carbon atoms in the alcohol residues thereof, said process comprising reacting the liquid mixture with a hydride selected from the group consisting of alkali metal hydrides and alkaline earth metal hydrides, said hydride being capable of complexing with said other organometallic compound of the liquid mixture and non-reactive with the hydrocarbon lead compound and being provided in proportions of at least about ½ mole per mole of said other organometallic compound to form a complex, and thereafter separating out substantially pure hydrocarbon lead compound.

7. A process for separating tetraethyllead from triethyl aluminum which comprises treating a liquid mixture containing tetraethyllead and triethylaluminum with at least ½ mole of sodium hydride per mole of said triethylaluminum and thereby selectively reacting the triethylaluminum with the sodium hydride and forming two liquid phases thereby, one of said phases consisting essentially of pure tetraethyllead and the other phase consisting essentially of a complex of sodium hydride with triethylaluminum, and separating said phases.

8. A process for separating tetraethyllead from triethylborane which comprises treating a liquid mixture of tetraethyllead and triethylborane with sodium hydride in proportions of at least ½ mole per mole of said triethylborane, and thereby selectively reacting the triethylborane with the sodium hydride and forming a sodium hydride·triethylborane complex without reaction with the tetraethyllead, and then separating the thus formed complex and the tetraethyllead.

References Cited in the file of this patent

UNITED STATES PATENTS 2,786,860    Ziegler et al. _____ Mar. 26, 1957

FOREIGN PATENTS 1,057,600    Germany _____ May 21, 1959

OTHER REFERENCES

Article by Zakharkin et al., in Isvestiya Akad. Nauk S.S.S.R. 1959, No. 1, page 181 (photocopy of original and 3 pages English abstract thereof (SOV./62–59–37/38).

UNITED STATES PATENT OFFICE
CERTIFICATE OF CORRECTION

Patent No. 3,088,957                         May 7, 1963

Tom W. McKay

It is hereby certified that error appears in the above numbered patent requiring correction and that the said Letters Patent should read as corrected below.

Column 7, line 14, after "of" insert -- diethylene glycol, the dimethyl ether of --; column 10, lines 55 and 56, for "metal compound is an alkali complexing chloride" read -- complexing compound is an alkali metal chloride --; same column 10, lines 59 and 60, for "metal compound is an alkali complexing hydride" read -- complexing compound is an alkali metal hydride --.

Signed and sealed this 26th day of November 1963.

(SEAL)
Attest:
ERNEST W. SWIDER

Attesting Officer

EDWIN L. REYNOLDS

Acting Commissioner of Patents

Disclaimer 3,088,957.—*Tom W. McKay*, Baton Rouge, La. METHOD FOR SEPARATING ORGANOLEAD COMPOUNDS. Patent dated May 7, 1963. Disclaimer filed June 20, 1969, by the assignee, *Ethyl Corporation*.
Hereby enters this disclaimer to claim 1 of said patent.
[*Official Gazette October 14, 1969.*]